D. C. ABBOTT.
IRRIGATING APPARATUS.
APPLICATION FILED MAR. 27, 1917.
1,294,749.
Patented Feb. 18, 1919.
2 SHEETS—SHEET 2.
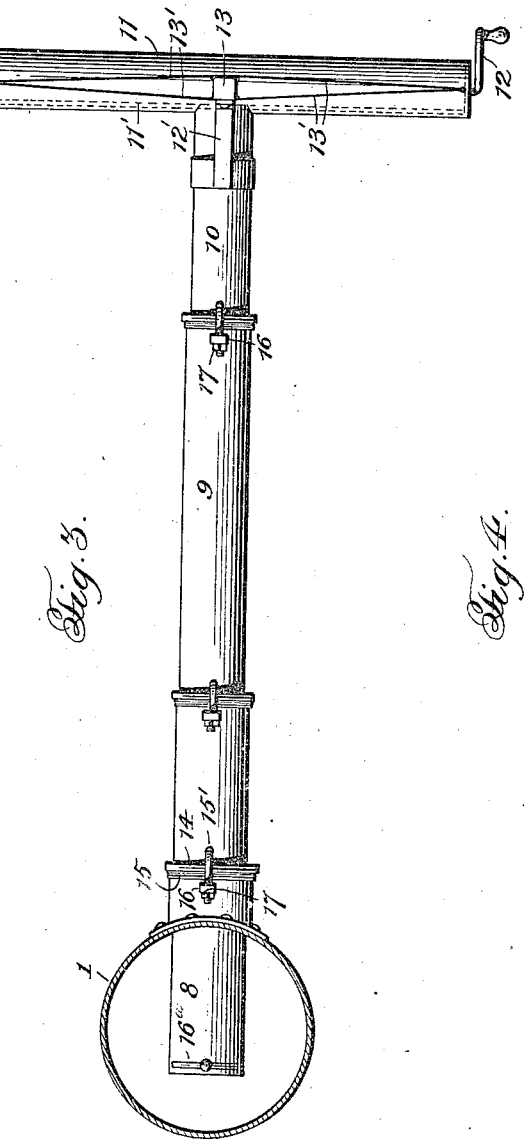
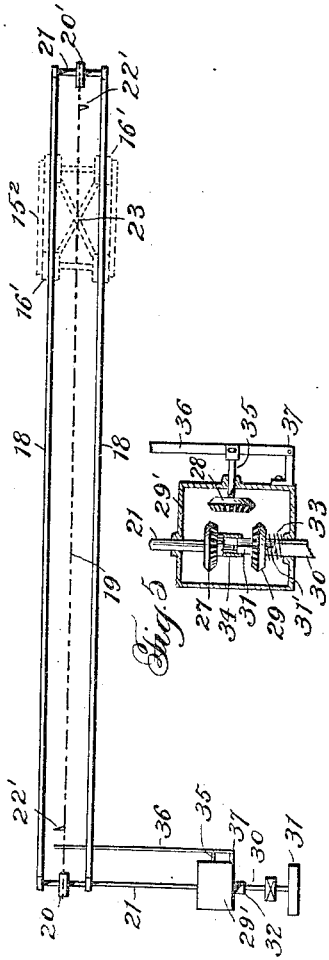
Witness:
Jas E Hutchinson
Inventor:
Dewitt C. Abbott,
By Burr Milans, Attorneys

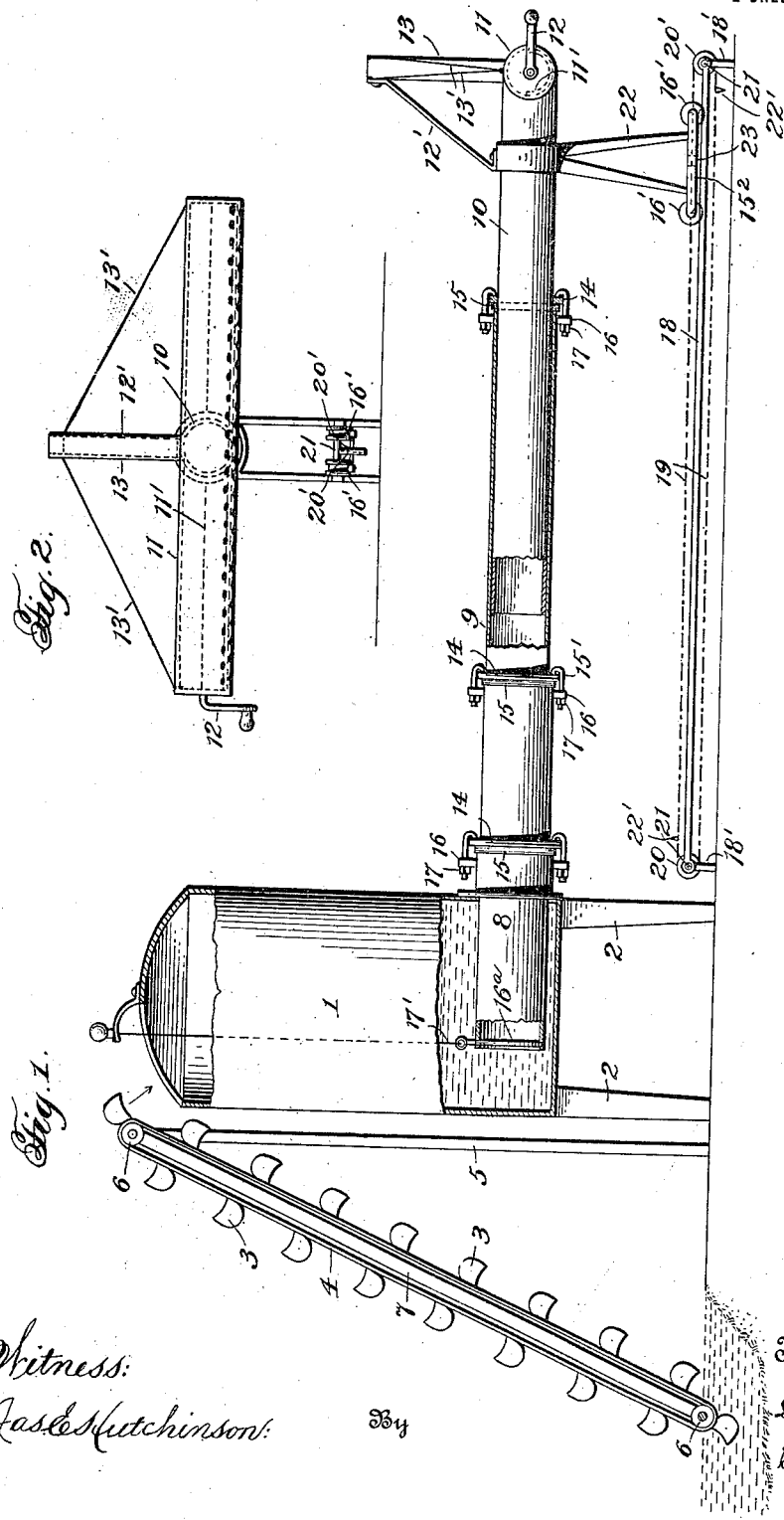

UNITED STATES PATENT OFFICE.

DEWIT C. ABBOTT, OF AUGUSTA, KANSAS.

IRRIGATING APPARATUS.

1,294,749.   Specification of Letters Patent.   Patented Feb. 18, 1919.

Application filed March 27, 1917. Serial No. 157,748.

*To all whom it may concern:*

Be it known that I, DEWIT C. ABBOTT, a citizen of the United States, residing at Augusta, in the county of Butler and State of Kansas, have invented certain new and useful Improvements in Irrigating Apparatus, of which the following is a specification, reference being had therein to the accompanying drawings.

The invention relates to improvements in an irrigating apparatus.

It is an object of the invention to provide an apparatus of this character carrying a discharging nozzle capable of a relatively great adjustment to permit the surface of various areas to be sprinkled in a constant and steady manner. In carrying out the invention I preferably employ a supply tank for the water that is adapted to always be filled to a given level, the said tank communicating with the discharge nozzle by means of a series of telescoping pipes, which will permit the discharge nozzle to be moved toward or from the tank to sprinkle different portions of the ground at the will of the operator.

The invention also embraces a simple and efficient means for rapidly adjusting the position of the spraying nozzle relative to the supply tank, comprising an endless conveyer stationed at a given point and having a connection with the outermost of the pipe sections whereby this section and the nozzle are moved back and forth by the conveyer, it of course being understood that the conveyer may be actuated by a source of motive power or manually, as desired.

A still further object of the invention is to provide automatic reversing means for the belt to rapidly move the nozzle back and forth over the ground whereby the surface of the ground is sprayed in a rapid and effective manner.

In the accompanying drawings I have illustrated the preferred embodiment of my invention, but it will, of course, be understood that various changes in the construction and arrangement of parts may be made without departing from the spirit of the appended claims.

In the drawings,

Figure 1 is a side elevation, portions being shown in section;

Fig. 2 is a forward end view;

Fig. 3 a top view, portions being shown in section;

Fig. 4 is a top view of the track and immediately associated parts; and

Fig. 5 is a detail sectional view of portions of the reversing mechanism.

Referring now more particularly to the drawings wherein like reference characters indicate corresponding parts, the numeral 1 designates a supply tank of any convenient size and construction and suitably supported upon the standards 2. The tank is filled with water by any suitable means, but preferably is located adjacent an irrigating channel or any other source of supply, and water is conveyed thereto by a plurality of buckets 3 carried by the endless bolt 4 passing around the supporting wheels 6 arranged at each end of an inclined frame 7. The frame is supported by the standards 5 and occupies the inclined position as disclosed in Fig. 1 of the drawings. The buckets during their operation pass through the irrigating channel or other source of supply and thence carry the water to the tank discharging the same through the open upper end thereof. The conveyer carrying the multitude of buckets may be driven by a motor or manually, and as this forms no part of the present invention, a specific driving means is not disclosed, it being understood that the water is always maintained at a given level in the tank, so that the spraying nozzle to be presently described will always discharge constant and steady streams.

Extending from the tank 1 is a pipe 8 of any construction desirable and having its inner end located well within the interior of the tank, the outer end of the pipe terminating a short distance in front of the tank and receiving a pipe 9 of a diameter less than the pipe 8. The pipe 9 in turn receives a third pipe 10 carrying at its outer end a discharge nozzle, and the pipes 8, 9 and 10 are all adapted to telescope, so that the nozzle is permitted to move to different positions relative to the discharge tank 1. For the purpose of illustration, and not for limitation, I have shown the apparatus as embodying three telescopic pipes, but it will be apparent that any number of pipes may be used in keeping with the conditions encountered.

The spray nozzle 11 carried by the pipe 10 extends beyond each side of the pipe, being of a relatively great width and perforated in its under face with a series of rows of apertures of different sizes to discharge the water from the tank in small jet-like streams upon the surface of the land over which the same is disposed. To control the discharge of water through the apertures a rotary valve 11' of segmenal formation is disposed within the nozzle and is adapted to be actuated by the handle 12 so as to leave any one of the rows of the discharging apertures exposed at a single time, or to permit all of these apertures to be opened simultaneously if the surface of the land is relatively dry and needs considerable watering. The valve 11' is of the conventional type and no detail description thereof is necessary. As the nozzle is relatively wide and heavy, some means is required to support the same without placing undue strain upon the pipe sections, and to this end a relatively rigid diagonal support 12' is disposed upon the outer pipe section and connected at its upper end to the cross arm 13 extending at right angles to the nozzle to which a plurality of supporting elements 13' are attached, these supporting elements in turn being fastened to the nozzle 11 at various points.

To prevent leakage between the various pipe sections, but at the same time permitting a free telescopic action therebetween and eliminating all binding, suitable packing rings 15 are arranged around each pipe, and surrounding these rings are metallic collars 14 adjustably mounted so as to compress the packing rings into engagement with the ends of the pipe sections and against the surface of the said pipe sections. To retain the collars in their adjusted positions, hook bolts 15', are provided passing through apertures in the upturned flanges 16 of each pipe and having threaded ends receiving the tightening nuts 17 for compressing and retaining the packing rings in their proper positions. The end of the pipe 8 is formed to receive a slide valve 16ª controlling the admission of the water from the tank to the discharge nozzle, and this valve is actuated by the cord 17' extending from the tank and accessible from the upper end thereof.

To move the spraying nozzle 11 back and forth toward the water tank 1, a carriage 15ª is employed having wheels 16' thereon riding upon the track members 18 stationed a slight distance from the ground and supported by the supports 18', an endless operating belt 19 being positioned between the track members 18 and passing around pulleys 20 and 20' carried by the shafts 21 supported by the track frame 18' The carriage 15² has arranged thereon the upright 22 fastened to the outermost pipe section 10 at a point immediately below the bracing rod 12 to provide a connection between said pipe section and the carriage. The carriage 15² is secured to the endless belt by the connecting member 23 so that the same is movable with the belt and it will, therefore, be seen that as the belt moves back and forth around its supporting pulleys 20 and 20', the telescopic pipe sections secured to the carriage 15 will be alternately moved back and forth during a corresponding movement of the belt and will cause the telescoping and extending of the various pipe sections 8, 9 and 10 so as to permit the spraying nozzle 11 to pass back and forth over the land. The belt is provided with a pair of depending trips 22', one trip being disposed near each end of the track member 18 when the nozzle is adjacent the tank, the trip at the inner end of the tracks being secured to the upper portion of the belt while the other trip is at this time occupying a position near the outer end of the track and projecting from the lower portion of the belt, the purpose of the trips to be more fully hereinafter described.

For automatically reversing the direction of movement of the belt, and correspondingly reversing the movement of the nozzle, the shaft 30 is provided at its outer end with a squared portion 31, the beveled gear 29 being mounted on the squared portion of the shaft for a sliding movement and carrying on one side a squared projecting portion 31' extending a substantial distance beyond the face of the gear. The gear is normally maintained in the position disclosed in Fig. 5 by a coil spring 33 surrounding the shaft 30 and bearing against the surface of the gear 29. The gear 27 is rigidly attached to the shaft 21 and this gear is also provided with a forwardly projecting socket portion 34 adapted to receive the squared portion 31 of the gear 29 when the reversing gear 28 is moved out of contact with the gears 27 and 29, providing a direct drive from the source of power to the pulley 20 and rotating the shaft 21 in one direction. The reversing gear 28 is supported upon the shaft 35 passing through an aperture in the housing 29', and this gear is shifted through the medium of the lever 36 pivoted at 37 and extending to a position underlying the belt 19. As the belt moves in one direction, the same engages the inner end of the lever 36, shifting the same upon its pivot 37 and throwing the reversing gear 28 into mesh with the gears 27 and 29, thus separating the squared portion 31' from the socket 34 and driving the shaft 21 through the gear 28, imparting to the shaft 21 a rotation in a direction opposite to the rotation imparted thereto when the shaft 30 is directly coupled therewith. After the shifting of this lever the belt moves the length of the track, whereupon the other trip member 22' engages the opposite side of the lever 36, moving the same and throwing the gear 28 out of mesh with the gears 27 and 29, this of course reversing the direction of travel of the belt. While I preferably employ the form of reversing gear just described, it will, of course, be understood that any other mechanism capable of performing the desired results may be used without departing from the invention.

Having thus described the invention, what is claimed as new and desired to be secured by Letters Patent is:—

1. In an irrigating apparatus of the character described, an extensible supply pipe, a movable support near the outer end thereof, an elongated transversely disposed nozzle on the free end of the supply pipe substantially in the plane of the pipe and extending laterally beyond the opposite sides thereof, an upright disposed centrally of said nozzle, a brace extending from the same to the movable support of the supply pipe, and lateral supports extending from said upright and connected at points near the opposite outer ends of the nozzle to maintain the same in their suspended projecting positions.

2. An irrigating apparatus of the character described comprising an extensible supply pipe, a movable support for maintaining the same in a suspended position, an elongated transverse nozzle carried at the free end of said pipe and projecting laterally beyond the opposite sides thereof, a runway for said movable support enabling the same to be shifted to contract and extend the supply pipe to correspondingly change the position of the nozzle, a carrier secured to the support, means for operating the carrier, and automatic reversing mechanism therefor controlled by parts directly on and moving with the carrier.

In testimony whereof I hereunto affix my signature in the presence of two witnesses.

DEWIT C. ABBOTT.

Witnesses:
G. W. NEALE,
W. M. ABBOTT.